J. DAY.

CURTAIN PIN.

No. 10,464. Reissued Apr. 1, 1884.

Witnesses

Chas H. Smith

Harold Serrell

Inventor

John Day per Lemuel W. Serrell

Atty.

N. PETERS, Photo-Lithographer, Washington, D. C.

UNITED STATES PATENT OFFICE.

JOHN DAY, OF BROOKLYN, NEW YORK.

CURTAIN-PIN.

SPECIFICATION forming part of Reissued Letters Patent No. 10,464, dated April 1, 1884.

Original No. 275,160, dated April 3, 1883. Application for reissue filed February 13, 1884.

*To all whom it may concern:*

Be it known that I, JOHN DAY, of Brooklyn, in the county of Kings and State of New York, have invented an Improvement in Curtain-Pins, of which the following is a specification.

Curtain-pins have been made with an ornamental head and screw-shank. My improvement is for the purpose of strengthening the shank of the curtain-pin without increasing the cost.

Figure 1:
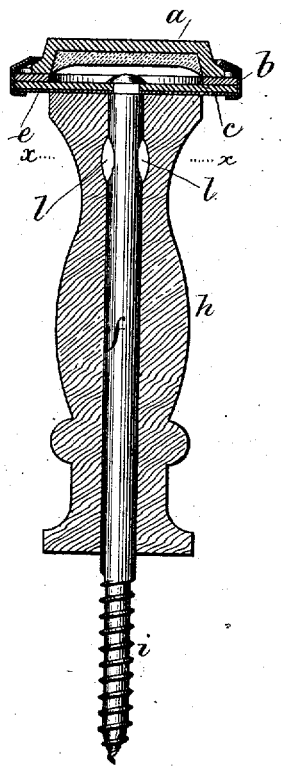
Figure 3:
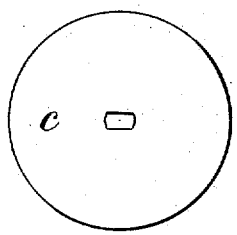
Figure 2:
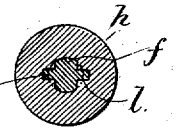

In the drawings, Figure 1 is a section longitudinally of the curtain-pin. Fig. 2 is a cross-section at *x x*, and Fig. 3 is a plan of the back plate.

Ornamental heads for picture-nails and curtain-loops have been made with a head of glass similar to the ornament *a*, and with a rim, *b*, around the same, by which the ornamental surface is attached to the back plate, *c*; and to this back-plate the metallic screw-stem *f* has been attached, either permanently or removably. This feature, in itself, I do not therefore claim. I prefer to employ a back plate, *c*, of heavy sheet-iron, and either enamel the back surface, or else introduce a plate, *e*, of thin japanned iron or other smooth sheet metal.

The stem *f* of the curtain-pin is made with a screw, *i*, at one end, and the other end is attached firmly to the metal back of the ornamental head. I have shown the same as reduced to fit a square or polygonal hole in the back plate, *c*, and the end of the stem is riveted up. In stems for curtain-pins it has been usual to make a flange upon the metal stem itself, so as to form a base to screw against the wood-work of the window-frame. This renders the stem expensive, and it is easily bent.

I make use of the wooden shank *h*, that is hollow for the screw-stem to pass through, and the surface is turned with ornamental moldings and coves. I also prefer to make use of a feather, *l*, upon the stem, entering a slot in the shank, or to use some other device that connects the shank and screw-stem, so that they are turned with and by the shank in screwing the curtain-pin into the window-casing. This shank serves to stiffen the stem, and, being clamped between the back plate of the head and the window-casing, it forms a very firm and strong stem for the curtain-pin, and improves the appearance of the article.

I claim as my invention—

1. The improved curtain-pin comprehending the ornamental head *a*, the metal back plate, *c*, the clamping-rim *b*, the screw-stem *f*, riveted at one end to the metal back plate, and the hollow ornamental shank surrounding the screw-stem, substantially as set forth.

2. The curtain-pin having an ornamental head, a metallic back, and a screw-stem fastened to such metallic back, a wooden shank, *h*, with an ornamental exterior surface, and a central hole through which passes the screw-stem, substantially as and for the purposes set forth.

3. The curtain-pin having an ornamental head and a metallic back, a screw-stem attached to the metallic back, a tubular shank passed over the screw-stem, and a feather or projection to prevent the tubular shank being rotated upon the screw-stem, substantially as specified.

Signed by me this 15th day of January, A. D. 1884.

JOHN DAY.

Witnesses:

J. P. SHERLOCK,

W. ST. JOHN WOLSELEY.